United States Patent [19]

O'Connor et al.

[11] 4,267,737

[45] May 19, 1981

[54] DUAL SUSPENSION GYROSCOPIC DEVICE HAVING POWERED GIMBAL SUPPORT

[75] Inventors: Bernard J. O'Connor, Eastchester, N.Y.; William H. Ficken, Berkeley Heights, N.J.; Tony R. Carnevale, Oradell, N.J.; Michael J. Lanni, Ridgewood, N.J.

[73] Assignee: The Bendix Corporation, Teterboro, N.J.

[21] Appl. No.: 965,762

[22] Filed: Dec. 4, 1978

[51] Int. Cl.$^2$ .................. G01C 19/28; G01C 19/30
[52] U.S. Cl. .................. 74/5.47; 74/5.6 D; 74/5.6 E; 74/5.9
[58] Field of Search ............... 74/5.6 D, 5.6 R, 56 E, 74/5.9, 5.4, 5.47, 5 R

[56] References Cited

U.S. PATENT DOCUMENTS

| | | | |
|---|---|---|---|
| 1,279,471 | 9/1918 | Sperry | 74/5.9 X |
| 3,512,264 | 5/1970 | Ambrosini | 74/5.6 E X |
| 3,534,616 | 10/1970 | O'Connor | 74/5.47 X |
| 3,559,493 | 2/1971 | Brooks et al. | 74/5 X |
| 3,803,924 | 4/1974 | Schulien et al. | 74/5 R |

Primary Examiner—Rodney H. Bonck
Attorney, Agent, or Firm—Anthony F. Cuoco; William F. Thornton

[57] ABSTRACT

A dual suspension gyroscopic device includes a gyro having at least a single degree of freedom and defining an output axis, i.e., the sensitive axis of the gyroscopic device. The gyro is supported by a gimbal which in turn is supported in a case for unlimited angular displacement about the gimbal axis. The arrangement provides low torque suspension about the sensitive axis while permitting normal angular displacement about said axis and maintaining the gyro spin axis in a reference plane. A data transferring slip ring assembly is arranged with the gimbal support and the slip ring assembly and support arrangement is powered to minimize friction about the gimbal axis.

14 Claims, 3 Drawing Figures

DUAL SUSPENSION GYROSCOPIC DEVICE HAVING POWERED GIMBAL SUPPORT

DESCRIPTION OF THE INVENTION

1. Field of the Invention

This invention relates generally to gyroscopic devices and particularly to such devices having low torque suspension on the sensitive axis while maintaining normal angular displacement about said axis and unlimited angular displacement about a gimbal axis. More particularly, this invention relates to a device of the type described including means for minimizing friction associated with data transferring means arranged with the gimbal support means.

2. Prior Art

Gyroscopic devices such as, for purposes of illustration, directional gyros, depend on ball bearings for their gimbal suspension. With this arrangement, drift is typically 3° to 5° per hour due to torques generated by bearing and slip ring friction. Significant improvement in drift rate is achieved by employing sensors embodying an essentially torque free gimbal suspension. However, these sensors restrict gyro float freedom to approximately 1°–2°. For applications such as in tanks or other ordnance type vehicles, where directional gyros are used in land navigation systems, the vehicle tilt angle due to ground slope conditions can be as much as ±40°. It is therefore necessary to provide a directional gyro to accommodate this condition while avoiding gyro tumbling and maintaining the gyro spin axis in a horizontal reference plane. Commonly assigned U.S. application Ser. No. 882,721, filed by M. J. Lanni, et al, on Mar. 2, 1978, describes a dual suspension implementation for accomplishing this purpose.

In the arrangement described in the aforenoted U.S. application Ser. No. 882,721, a gimbal is supported in a case to provide unlimited freedom about the gimbal axis for transferring data via means arranged with the gimbal support. An arrangement of this type results in undesirable friction about the gimbal axis. In the present invention this friction is minimized by powering the data transferring means and gimbal support arrangement.

SUMMARY OF THE INVENTION

This invention contemplates a gyroscopic device having a dual suspension arrangement on its sensitive axis. This is accomplished by using, for purposes of illustration, an inertial grade gyro having at least a single degree of freedom as an inertial element thereby providing low torque suspension. The gyro is supported by a gimbal to provide normal angular displacement with reference to a leveling axis. The gimbal, in turn, is supported by a case to provide unlimited angular displacement with reference to the gimbal axis. The arrangement includes three signal loops, i.e., a caging loop, a leveling loop and a powered gimbal support loop. The caging loop cages the gyro case to its sensitive element (float) via a caging torquer, thereby compensating for any frictional torques caused by the gimbal bearings and the electrical circuit conductors acting on the leveling axis pivots. The leveling loop maintains the spin axis in a reference plane via a level sensor and a leveling torquer. The powered gimbal support loop servoes the gimbal support and associated data transmitting slip ring assembly, thereby minimizing friction about the gimbal axis caused by said support and data transmitting assembly.

DETAILED DESCRIPTION OF THE DRAWINGS

Figure 1:
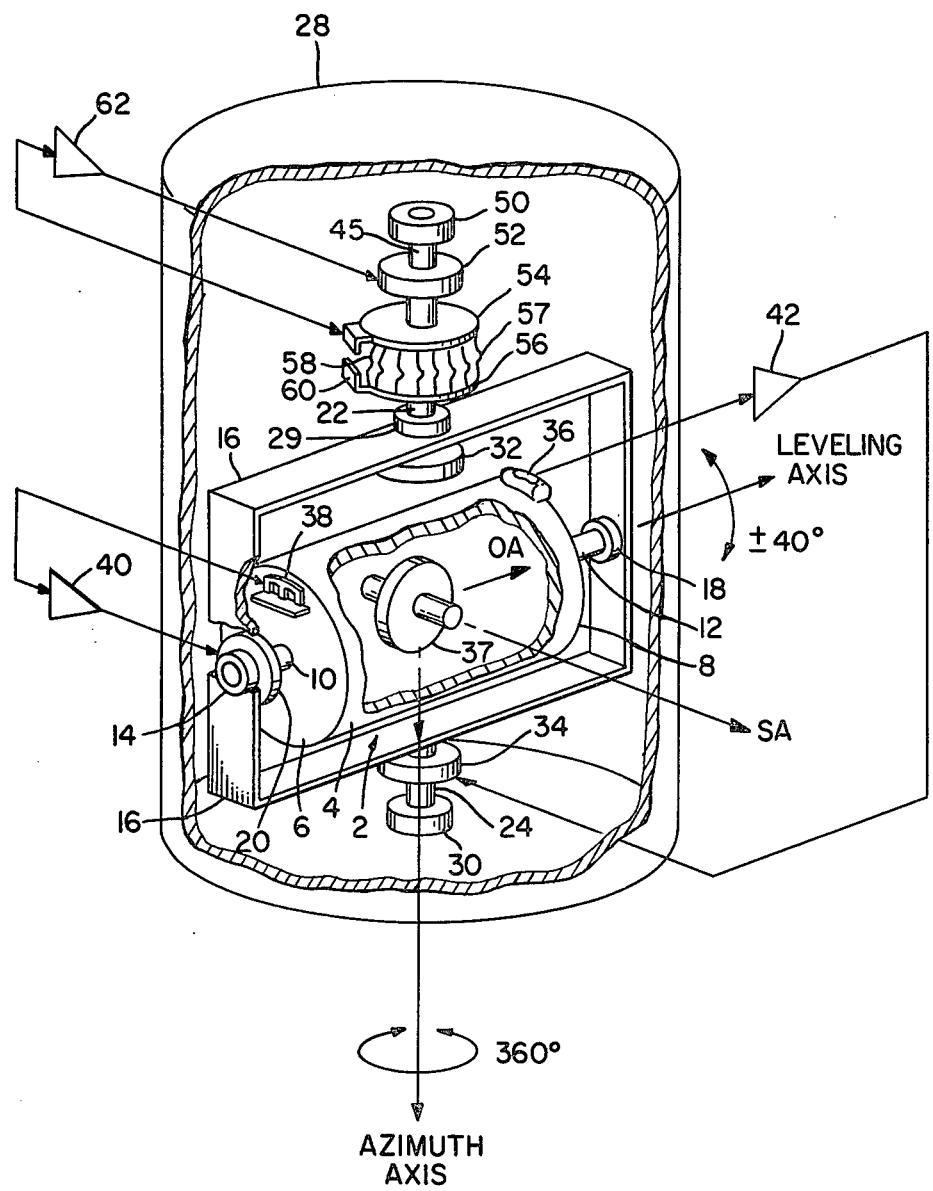
FIG. 1 is an isometric diagrammatic representation of a gyroscopic device according to the invention.
Figure 2:
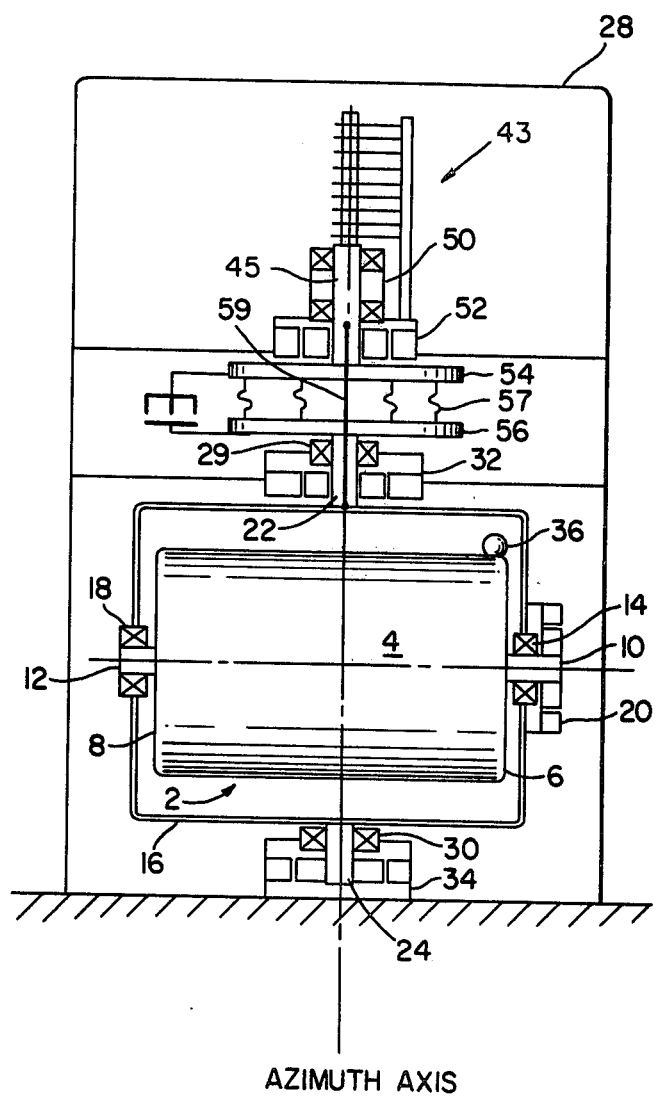
FIG. 2 is a diagrammatic plan view of a gyroscopic device according to the invention and particularly showing the data transmitting slip ring assembly gimbal suspension means.

With reference to FIGS. 1 and 2, a gyroscopic device in accordance with the invention is shown as including a gyro designated generally by the numeral 2 and including a case 4 having opposite ends 6 and 8. Gyro 2 will be hereinafter more fully referred to.

End 6 of case 4 carries a pivot 10 while end 8 carries a pivot 12. Pivot 10 is journaled in one end of a gimbal 16 by a conventional ball bearing 14, while pivot 12 is journaled in the opposite end of gimbal 16 by a like ball bearing 18. Case 4 is thus displaceable about a leveling axis as particularly shown in FIG. 1. The leveling axis is coincident with the output axis (OA) of gyro 2, and which output axis is the sensitive axis of the gyroscopic device herein described.

Pivot 14, journaled in gimbal 16 as heretofore noted, supports the rotor member of a caging torquer 20 having a purpose which will be hereinafter described.

Gimbal 16 carries a pivot 22 on one side thereof and carries a pivot 24 on the opposite side. Pivot 22 is journaled in one side of a gyroscopic device case 28 by a conventional ball bearing 29, and pivot 24 is journaled in the opposite side of case 28 by a like ball bearing 30. Gimbal 16 has unlimited angular displacement (±360°) about the azimuth axis as indicated in FIG. 1.

Pivot 22, journaled in case 28 as heretofore noted, supports the rotor member of an azimuth synchro 32 carried on the one side of case 28 while pivot 24 journaled in case 28 as heretofore noted, supports the rotor member of a leveling torquer 34 carried on the opposite side of case 28.

Azimuth synchro 32 provides a readout of azimuth information as will hereinafter be more fully described and leveling torquer 34 cooperates with a level sensor 36 carried on gyro case 4 to maintain the gyro spin axis (SA) of a gyro rotor 37, as shown in FIG. 1, in a horizontal reference plane as will also be hereinafter more fully described.

The electrical configuration of the invention as shown in FIG. 1 includes three servo loops, i.e., a caging loop, a leveling loop and a powered gimbal pivot loop. The caging loop cages case 4 of gyro 2 to its sensitive element (float), thereby compensating for any frictional torques caused by the aforenoted bearings 14 and 18 and the necessary electrical conductors associated with pivots 10 and 12, as will be understood by those skilled in the art. To this end, a conventional "E" type pick-off 38 (FIG. 1) is connected through a caging amplifier 40 to caging torquer 20.

The leveling loop maintains the spin axis (SA) of gyro 2 in the horizontal reference plane via level sensor 36 mounted on case 4 and sensitive to displacement of case 4 about the leveling axis. Signal from sensor 36 is applied to a leveling amplifier 42 thence to leveling torquer 34. In this connection, level sensor 36 is illustrated as a conventional electrolytic switch commonly referred to as a "bubble" switch. It is to be noted, however, that any pendulous type switch as may be known in the art will satisfy the purposes of the invention as well.

The powered gimbal pivot loop will be hereinafter explained with reference to FIGS. 1 and 2.

With reference now to gyro 2, as particularly shown in FIG. 1, the gyro is an inertial grade gyro which is used as the inertial element for the gyroscopic device of the invention. A gyro which serves this purpose is a single degree of freedom gyro of the type having liquid hydrostatic gimbal supports such as described in commonly assigned U.S. Pat. No. 3,803,924, issued on Apr. 16, 1974, to Harold E. Schulien, et al. The gyro as described therein, and which description is incorporated herein by reference, includes rotor element 37 rotatably mounted, for example, by conventional ball bearings (not shown) for rotation about the spin axis (SA). The rotor element is disposed in a housing, with the rotor and housing forming a gyro gimbal element or float. The float is disposed in a case, which is case 4 in the arrangement herein described, and hydrostatically supported therein as described in the aforenoted U.S. Pat. No. 3,803,924. It will suffice for purposes of the present invention to say that a liquid is circulated by a pump to provide both axial and radial lift for the float and to thereby provide the very low torque (high performance) hydrostatic bearing means.

It is to be understood that other type high performance (inertial grade) gyros, such as a gyro having its float supported by gas, electrostatic, electromagnetic or spring supported means, or by such other means as may be desirable for a particular application, will serve the purposes of the invention as well. The gyro of U.S. Pat. No. 3,803,924 is a single degree of freedom gyro which is described for illustrative purposes only, while a two degree of freedom gyro such as manufactured by Teledyne Systems Co. and marketed as their SDG-5 gyro would also serve the purposes of the invention.

In view of the above, it will be understood that the dual suspension feature of the invention is accomplished by a very low torque suspension internal to case 4 of gyro 2 by way of the aforenoted hydrostatic bearing arrangement, while a bearing suspension is provided external to case 4 by way of the ball bearing arrangement including pivots 10 and 12 and ball bearings 14 and 18. The ball bearing suspension is necessary to accommodate required large displacements of gyroscopic device case 28 which correspond to vehicle displacements which may occur due to terrain variations as aforenoted. In this regard, it will be understood that the float of gyro 2, supported as aforenoted, has relatively limited freedom (1°-2°) about the sensitive (leveling) axis and the ball bearing suspension provides a relatively larger angular freedom (±40°) about said axis for the purposes described.

With reference to the caging loop, pick-off 38 is disposed interiorly of case 4 and senses displacement of the float relative to case 4 about the leveling axis. Torquer 20 is responsive to the signal of pick-off 38 for torquing the case about the leveling axis to cage the case to the float.

With reference to the leveling loop, sensor 36 provides a signal corresponding to the position of the spin axis relative to the reference (horizontal) plane. Torquer 34 is responsive to the signal for precessing case 4 to maintain the spin axis in the reference plane.

As heretofore noted, azimuth synchro 32 provides a readout of azimuth information. This information is transferred through a conventional brush and slip ring assembly 43 arranged with a pivot 45 as particularly shown in FIG. 2. This arrangement results in undesirable friction about the azimuth axis. The powered gimbal pivot loop heretofore referred to and to be now described minimizes this friction.

Thus, pivot 45 arranged with brush and slip ring assembly 43 for the data transmitting purposes described, is journaled in case 28 by a bearing 50 and carries a torquer 52. A printed circuit board 54 is carried by pivot 45 and a printed circuit board 56 is carried by pivot 22. The boards are connected by flex leads 57 which provide the required electrical connections as will be understood by those skilled in the art.

Another source of undesirable friction in the gyroscopic device being described is that which may be caused by the thrust load exerted by gimbal 16 and its associated components on azimuth axis bearings 29 and 30 under varying conditions of displacement of the gimbal. This friction is minimized by suspending the gimbal away from the bearings through a suspension wire 59 (FIG. 2) secured at its upper end to pivot 45 and secured at its lower end to gimbal 16.

The powered gimbal pivot loop as shown in FIG. 1 includes a pick-off 60, which may be a conventional E-type pick-off, connected to torquer 52 through a servo amplifier 62 which drives the torquer. Thus, the arrangement of slip ring assembly 43 and pivot 45 (FIG. 2) is servoed to correspond with gimbal 16 to eliminate the friction associated with transferring data through the aforenoted angular displacement of gimbal 16. Hence pivot 22 is an unpowered pivot while pivot 45 is a powered pivot as will now be understood by those skilled in the art.

Figure 3:
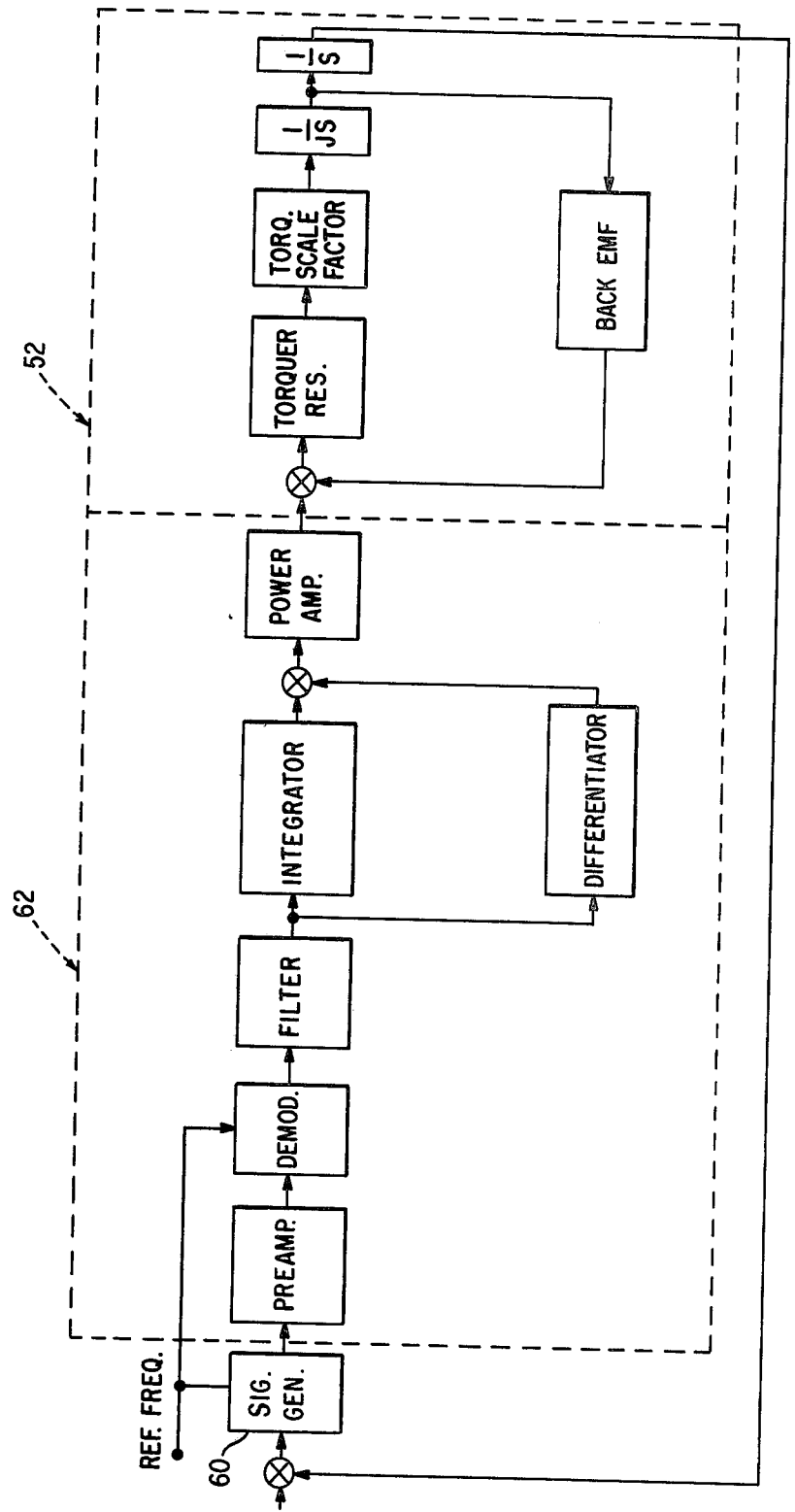
FIG. 3 is a block diagram of the powered gimbal support loop.

With reference to the block diagram of FIG. 3, the input to signal generator (E pick-off) 60 defines the difference in correspondence between unpowered pivot 22 and powered pivot 45. The signal generator responds to this difference or error to provide a signal applied to amplifier 62 which performs appropriate preamp, demodulating, filtering, integrating, differentiating and power amplifying functions as shown in the Figure. The output of amplifier 62 is applied to torquer 52, with the torquer also shown in the Figure. Torquer 52 torques pivot 45 to bring the pivot in correspondence with gimbal 16 to perform the function of the invention, i.e., eliminate undesirable friction about the azimuth axis. With further reference to FIG. 3, signal generator 60 is excited by a signal at a predetermined frequency provided by an external signal source (not shown) and the demodulator in amplifier 62 is referenced to the same signal.

What is claimed is:
1. A gyroscopic device comprising:
 a gyroscope having at least a single degree of freedom and including a first case, a float and low torque means for supporting said float in said first case for relative motion between said float and said first case about a first axis;
 a gimbal supporting said first case for relative motion of said gimbal and said first case about said first axis;

means responsive to relative motion between said first case and said float for caging said first case to said float;

a second case;

means supporting said gimbal in said second case for relative motion between said gimbal and said second case about a second axis;

means responsive to relative motion between said first case and said gimbal about said first axis for applying torque to said gimbal about said second axis to maintain the gyroscope spin axis in a reference plane;

sensing means mounted on said gimbal and providing data signals indicative of the displacement of said gimbal relative to said second case;

means mounted on said gimbal and rotatable relative thereto for transferring data signals from said gimbal mounted sensing means to points of utilization external to said second case;

means for sensing relative motion between said gimbal and said data transferring means; and means responsive to said sensed relative motion between said gimbal and said data transferring means for rotating said data transferring means.

2. A device as claimed in claim 1 wherein said gimbal mounted sensing means comprises a synchro element and said data transferring means comprises slip rings.

3. A device as claimed in claim 1 wherein said means supporting said gimbal in said second case comprises upper and lower pivots secured to said gimbal and rotatably journaled in said second case, said upper pivot being divided into first and second parts, both of which are rotatably journaled in said second case, said first upper pivot part including means for resisting thrust loads thereon; and means for suspending said second upper pivot part from said first upper pivot part.

4. A device as claimed in claim 3 wherein said gimbal mounted sensing means comprises a synchro element mounted for rotation with said second upper pivot part and said data transferring means comprises slip rings mounted for rotation with said first upper pivot part.

5. A device as claimed in claim 4 wherein said means for rotating said data transferring means includes a torque motor for applying torque about said second axis to said first upper pivot part.

6. A device as claimed in claim 5 wherein said data transferring means includes:

a first printed circuit board secured to said first upper pivot part and rotatable therewith;

a second printed circuit board secured to said second upper pivot part and rotatable therewith, said first and second printed circuit boards being in facing relationship;

said slip rings being conductively connected to points on said first printed circuit board;

said synchro element including a winding conductively connected to points on said second printed circuit board; and flexible conductor means interconnecting points on said first and second printed circuit boards.

7. A device as claimed in claim 6 wherein said means for sensing relative motion between said gimbal and said data transferring means comprises:

a first pick-off element mounted on said first printed circuit board; and a second pick-off element mounted on said second printed circuit board, said first and second pick-off elements being coupled together inductively.

8. A gyroscopic device, comprising:

a gyroscope having at least a single degree of freedom and including a first case, a float, a wheel defining a spin axis within said float and low torque means for supporting said float in said first case for relative motion between said float and said first case about a leveling axis;

a gimbal;

means pivotally mounting said first case to said gimbal for relative motion between said gimbal and said float about said leveling axis;

means responsive to relative motion between said first case and said float for caging said first case to said float;

a second case;

upper and lower pivot means supporting said gimbal in said second case for relative motion between said gimbal and second case about a second axis perpendicular to said leveling axis;

a first torque motor for applying torque to one of said pivots to rotate said gimbal relative to said second case;

means for sensing relative motion between said first case and said gimbal about said leveling axis and for controlling said first torque motor in accordance with said motion sensed about said leveling axis, the torque applied by said first torque motor to said gimbal tending to maintain the gyroscope spin axis in a referenced plane;

a synchro having a stator and a rotor for transmitting data indicative of the displacement of said gimbal relative to said second case, said synchro stator being fixed to one of said gimbal pivots, said synchro rotor being fixed to said second case;

data transmitting means including slip rings connected to windings of said synchro rotor for transmitting data signals from said synchro to points of utilization external to said second case;

means rotatively coupling said data transmitting means to one of said gimbal pivots;

a second torque motor for rotating said data transmitting means relative to said second case; and means for sensing relative motion between said synchro rotor and said data transmitting means for controlling said second torque motor to maintain the displacement between said data transmitting means and said synchro rotor at a minimum.

9. A device as claimed in claim 8 wherein said data transmitting slip rings are journaled in said second case for rotation relative thereto and wherein said synchro windings are connected to said slip rings by flexible conductors.

10. A device as claimed in claim 9 wherein said slip rings are journaled in said second case at a position in axial alignment with said upper gimbal pivot.

11. A device as claimed in claim 10 wherein said slip rings are journaled in said second case in a manner to resist thrust loads on said slip rings and wherein said means for coupling said data transmitting means to one of said pivots includes;

means for pendulously suspending said upper gimbal pivot from said slip rings.

12. A device as claimed in claim 11 with additionally, a first printed circuit board secured to said slip rings at the lower end thereof and rotatably therewith;

a second printed circuit board secured to said upper gimbal pivot and rotatable therewith and in facing relationship to said first printed circuit board;

said slip rings being conductively connected to circuit points on said first printed circuit board;

said synchro windings being conductively connected to circuit points on said second printed circuit board; and flexible conductors, constituting said flexible conductors connecting said slip rings to said synchro windings, interconnecting said circuit points on said first and second printed circuit boards.

13. A device as claimed in claim 12 wherein said means for sensing relative motion between said synchro rotor and said data transmitting means includes:

a pick-off comprising first and second relatively movable elements, one of said pick-off elements being secured to said first printed circuit board, the other of said pick-off elements being secured to said second printed circuit board.

14. A device as claimed in claim 13 wherein said pick-off elements are inductively coupled together.

* * * * *